US012809098B2

(12) United States Patent
Takezaki et al.

(10) Patent No.: US 12,809,098 B2
(45) Date of Patent: Nov. 24, 2026

(54) MULTI-FIBER OPTICAL FERRULE, MULTI-FIBER OPTICAL CONNECTOR, AND PRODUCTION METHOD FOR MULTI-FIBER OPTICAL FERRULE

(71) Applicant: HAKUSAN INC., Ishikawa (JP)

(72) Inventors: Motohito Takezaki, Ishikawa (JP); Moriaki Kobayashi, Ishikawa (JP); Shohei Ueno, Ishikawa (JP)

(73) Assignee: HAKUSAN INC., Ishikawa (JP)

( * ) Notice: Subject to any disclaimer, the term of this patent is extended or adjusted under 35 U.S.C. 154(b) by 381 days.

(21) Appl. No.: 18/693,781

(22) PCT Filed: Sep. 16, 2022

(86) PCT No.: PCT/JP2022/034819
§ 371 (c)(1),
(2) Date: Mar. 20, 2024

(87) PCT Pub. No.: WO2023/074185
PCT Pub. Date: May 4, 2023

(65) Prior Publication Data
US 2024/0385389 A1 Nov. 21, 2024

(30) Foreign Application Priority Data
Oct. 28, 2021 (JP) ................................ 2021-176725

(51) Int. Cl.
*G02B 6/38* (2006.01)
*G02B 6/40* (2006.01)
*G02B 6/00* (2006.01)

(52) U.S. Cl.
CPC ......... *G02B 6/3885* (2013.01); *G02B 6/3854* (2013.01); *G02B 6/3865* (2013.01); *G02B 6/406* (2013.01)

(58) Field of Classification Search
CPC ....... G02B 6/3885; G02B 6/3854; G02B 6/00
(Continued)

(56) References Cited

U.S. PATENT DOCUMENTS 4,818,059 A * 4/1989 Kakii .................. G02B 6/3839 385/83
10,222,559 B2 3/2019 Nakama et al.
(Continued)

FOREIGN PATENT DOCUMENTS

JP 5-60949 A 3/1993
JP 5-264867 A 10/1993
(Continued)

*Primary Examiner* — Kaveh C Kianni
(74) *Attorney, Agent, or Firm* — RANKIN, HILL & CLARK LLP

(57) ABSTRACT

[Problem] The purpose of the present invention is to provide a multi-fiber optical ferrule and a multi-fiber optical connector which have connection compatibility with conventional optical connectors.
[Solution] A multi-fiber optical ferrule 100 comprises: a main body which comprises a resin composition; a plurality of optical fiber insertion holes 103 which are provided in the main body and into which optical fibers 11 are inserted; and two guide pin holes 102 which are provided in the main body and into which guide pins are inserted, wherein the optical fiber insertion holes comprise not less than 24 holes and are provided on a straight line connecting the two guide pin holes, the optical fiber insertion holes have a small diameter part 110 and a large diameter part 106, the internal diameter of the small diameter part is 81 μm, and the pitch Pm for optical fiber insertion holes at the center part is twice the pitch P for optical fiber insertion holes other than those at the center part.

9 Claims, 8 Drawing Sheets

(58) Field of Classification Search
USPC .......................................................... 385/78
See application file for complete search history.

(56) References Cited

U.S. PATENT DOCUMENTS

| | | | | |
|---|---|---|---|---|
| 2008/0226241 | A1 | 9/2008 | Sugizaki et al. | |
| 2011/0064361 | A1* | 3/2011 | Seng ........................ | G02B 6/38 385/54 |
| 2012/0237168 | A1 | 9/2012 | Aoki et al. | |
| 2015/0010268 | A1* | 1/2015 | Badihi ..................... | G02B 6/32 438/31 |
| 2017/0192180 | A1 | 7/2017 | Andrus et al. | |
| 2021/0109296 | A1* | 4/2021 | Omura .............. | B29C 45/14065 |
| 2023/0036226 | A1 | 2/2023 | Wang et al. | |

FOREIGN PATENT DOCUMENTS

| | | | | | |
|---|---|---|---|---|---|
| JP | H0743558 | A | * | 2/1995 | |
| JP | H07113925 | A | * | 5/1995 | |
| JP | H09292547 | A | * | 11/1997 | |
| JP | 10-239563 | A | | 9/1998 | |
| JP | 2001051154 | A | * | 2/2001 | |
| JP | 2001-108867 | A | | 4/2001 | |
| JP | 2004-86069 | A | | 3/2004 | |
| JP | 2006-163210 | A | | 6/2006 | |
| JP | 2007-286354 | A | | 11/2007 | |
| JP | 5942880 | B2 | | 6/2016 | |
| JP | 2016-148709 | A | | 8/2016 | |
| JP | 2018-165814 | A | | 10/2018 | |
| JP | 2022119282 | A | * | 8/2022 | |
| WO | WO-2021208487 | A1 | * | 10/2021 | ........... G02B 6/3869 |

* cited by examiner

[Fig1]
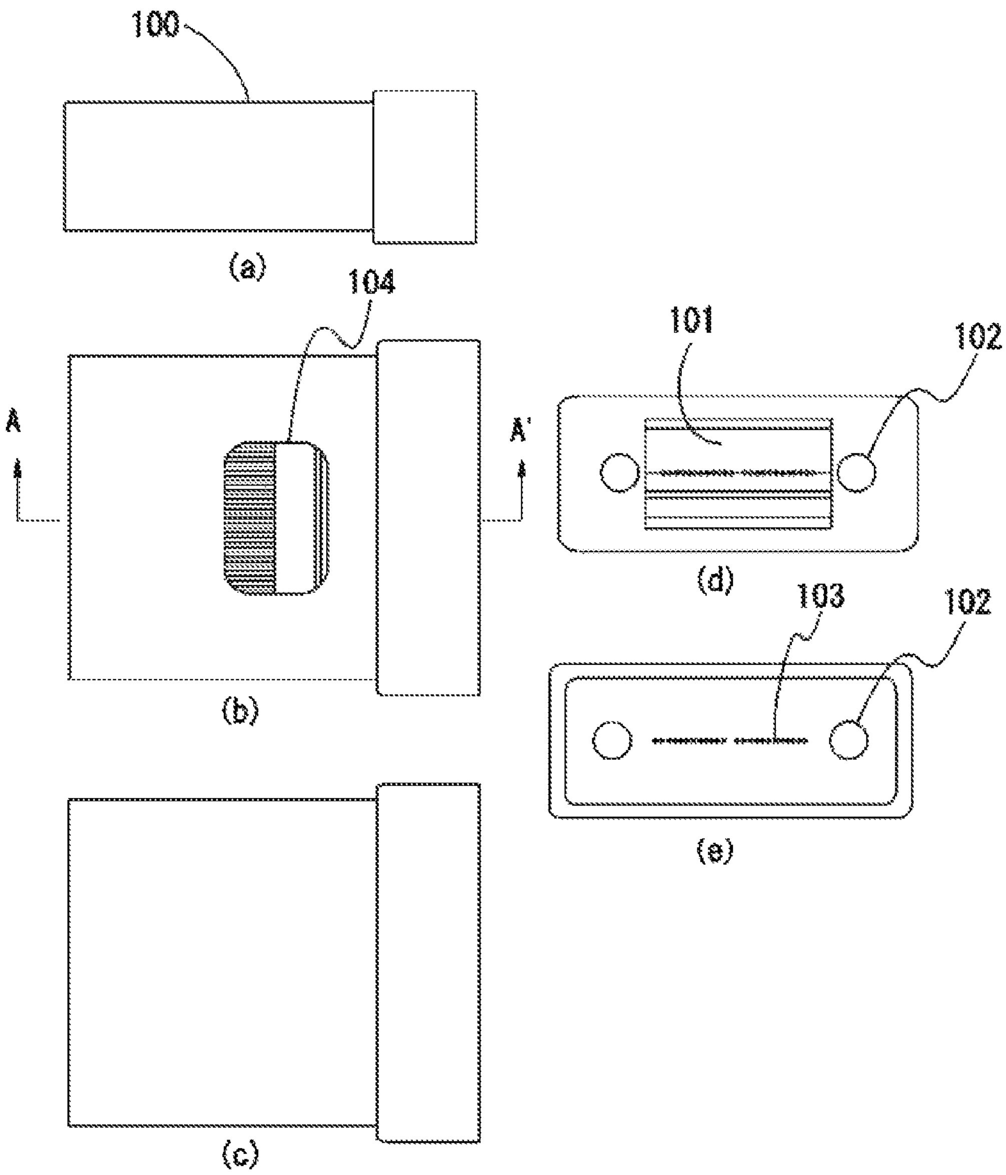

[Fig2]
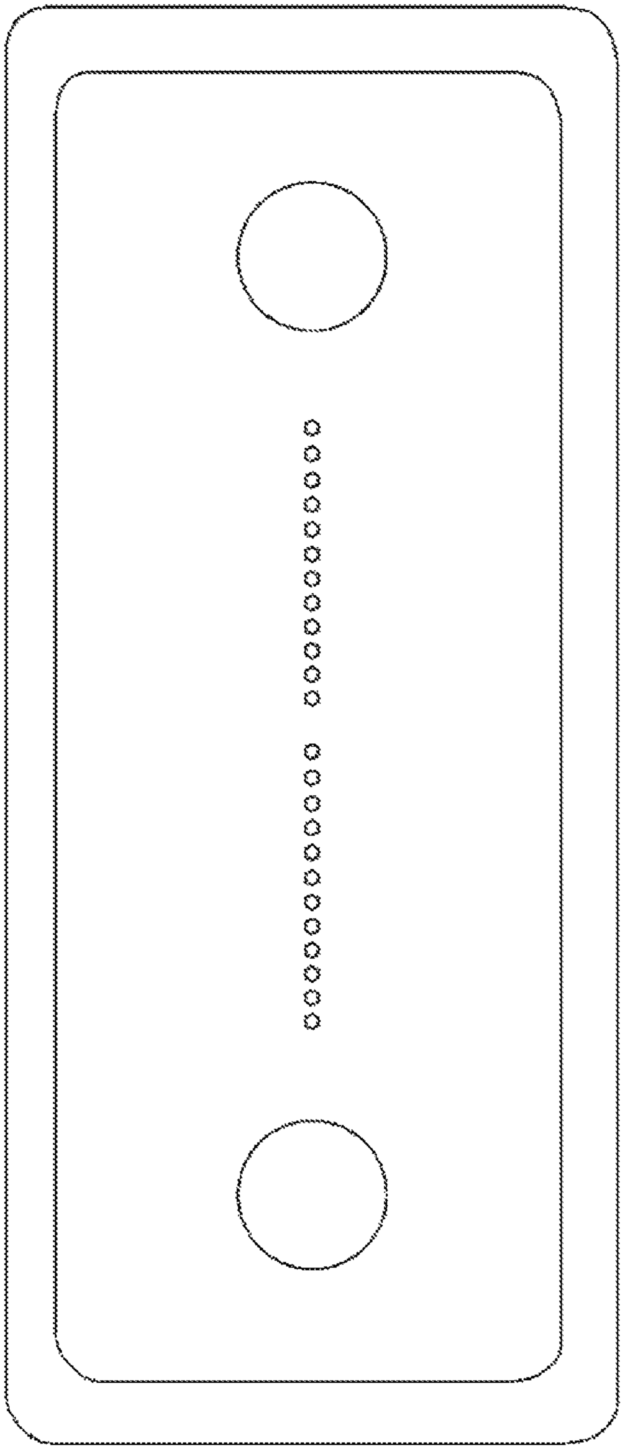

[Fig3]
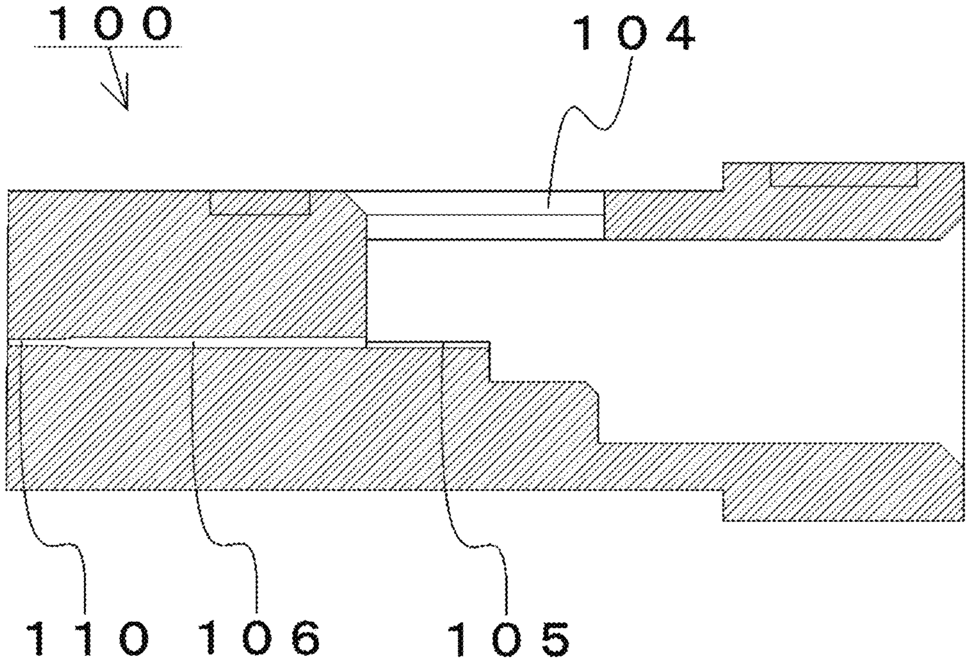

[Fig4]
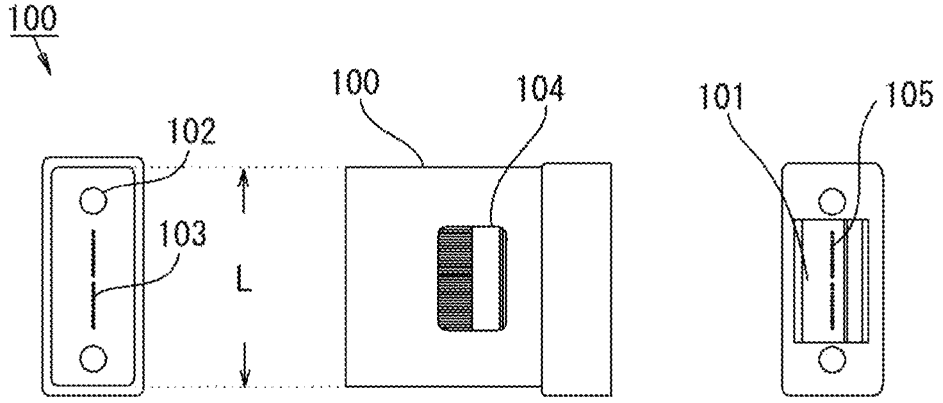

[Fig5]
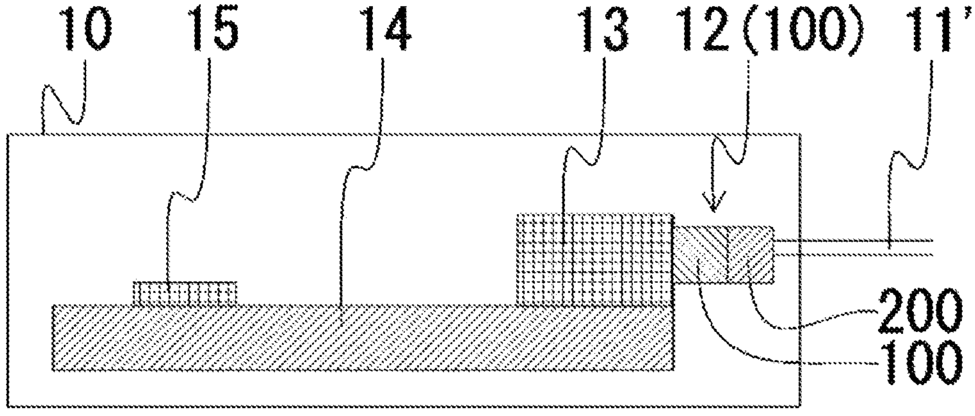

[Fig6]
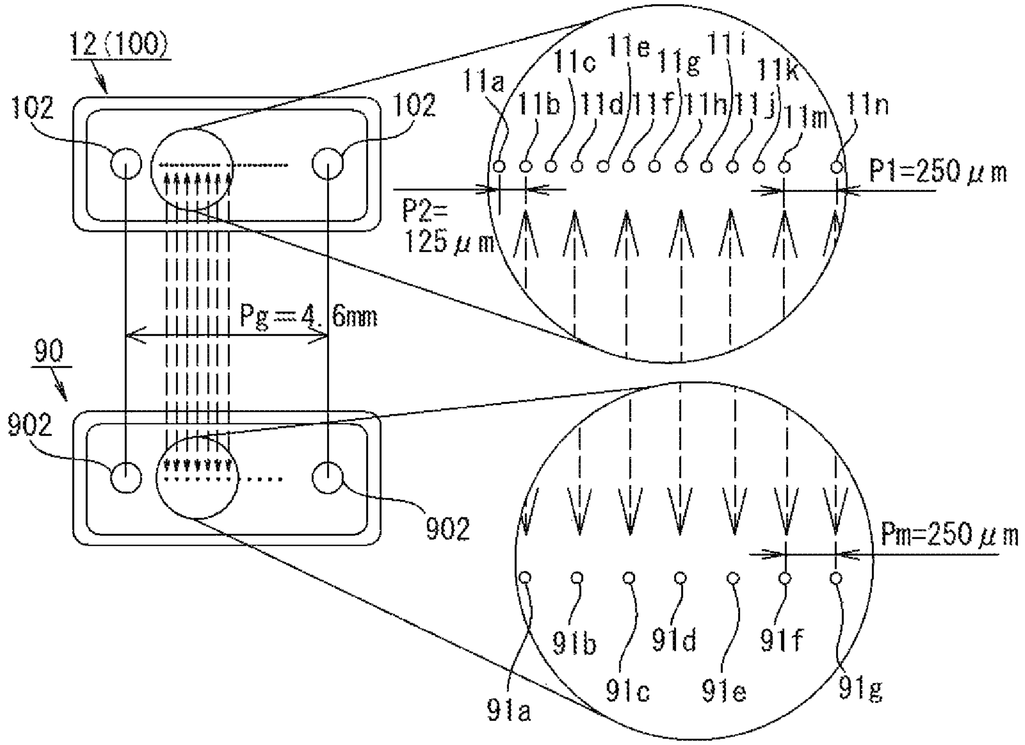

[Fig7]
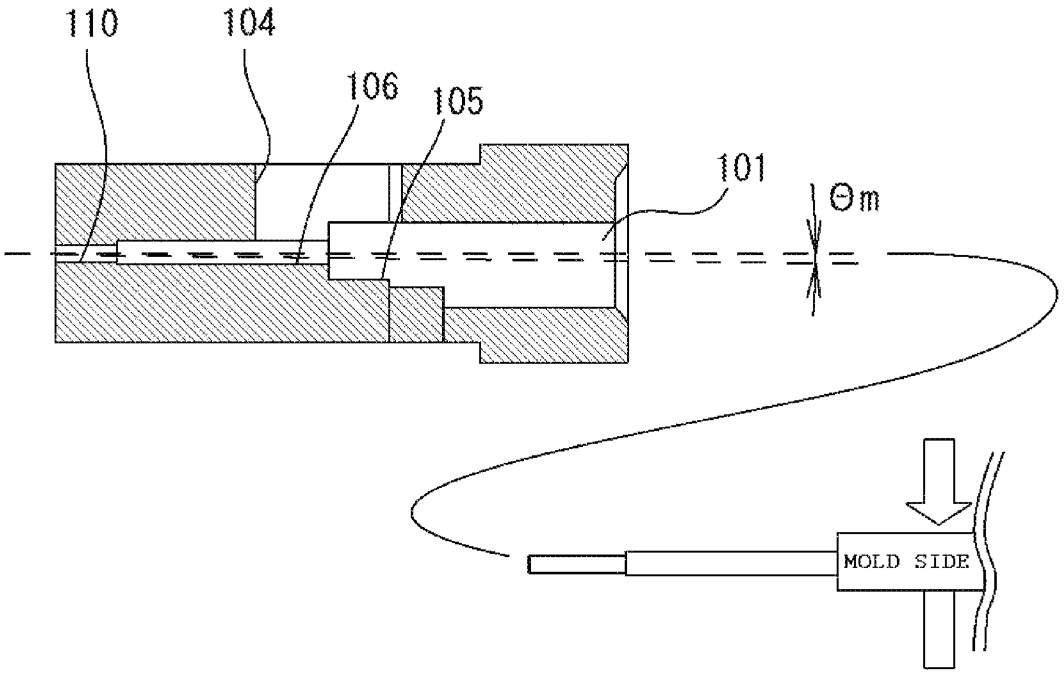

[Fig8]
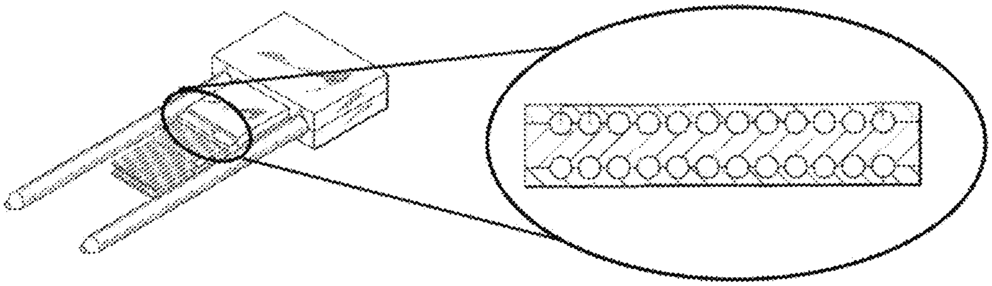
(a) (b)

MULTI-FIBER OPTICAL FERRULE, MULTI-FIBER OPTICAL CONNECTOR, AND PRODUCTION METHOD FOR MULTI-FIBER OPTICAL FERRULE

TECHNICAL FIELD

The present invention relates to a multi-fiber optical ferrule by which optical fibers of optical cables for transmitting optical signals are optically connected to each other, a multi-fiber optical connector, and a production method for a multi-fiber optical ferrule.

BACKGROUND ART

Since optical cables including optical fibers allow high-speed communication of a large amount of information, they are in widespread use for home information communication and industrial information communication.

For example, in Patent Literature 1 (Japanese Patent Laid-Open No. 2001-108867), high accuracy is required for a diameter of an optical fiber hole, a diameter of a guide pin hole, a distance between centers of left and right guide pin holes, and a position of each optical fiber hole with reference to a midpoint of a line segment connecting the centers of the left and right guide pin holes. If the required accuracy for these values cannot be satisfied in plastic molding of a ferrule, a product has to be discarded as a defective product, which leads to a decrease in manufacturing yield. However, there is disclosed that a problem is solved in that as the number of fiber holes increases, the ferrule is warped, which causes eccentricity of positions of the fiber holes.

A ferrule for a multi-fiber optical connector disclosed in Patent Literature 1 is a ferrule used as a multi-fiber optical connector of a fitting pin positioning type, the ferrule being made of plastic, wherein guide pin holes are formed on left and right sides of a plurality of optical fiber holes arranged side by side, and an intermediate portion between the left and right guide pin holes is thinned to be vertically symmetrical.

Patent Literature 2 (Japanese Patent Laid-Open No. 2004-86069) discloses a multi-fiber optical ferrule for 16 or more fibers, which can utilize a housing for an MT connector and is easily accurately molded, a multi-fiber optical connector, and an optical module using them.

The multi-fiber optical ferrule disclosed in Patent Literature 2 is a multi-fiber optical ferrule having a plurality of optical fiber insertion holes and two guide pin holes, wherein the optical fiber insertion holes for not less than 16 fibers are provided side by side in a line, and the outer shape and guide pin holes of the multi-fiber optical ferrule are configured to have the same shape and arrangement as the MT ferrule specified in IEC60874-16.

Patent Literature 3 (Japanese Patent Laid-Open No. 2007-286354) discloses an optical connector that prevents PC connection impediment caused by end face angle failure between ferrule distal end faces facing each other due to a projection generated on an obliquely polished surface of the ferrule.

The optical connector disclosed in Patent Literature 3 is an optical connector by which a pair of ferrules each having guide-pin guide holes formed in a longitudinal direction of the ferrule and an obliquely polished distal end face are pressed and held so that their obliquely polished surfaces closely contact each other, wherein recesses are formed at the edges of the guide-pin guide holes exposed on the obliquely polished surface.

Patent Literature 4 (Japanese Patent Laid-Open No. 2012-194481) discloses an optical connector that enables optical connection with low loss, compensating for a variation of the fiber projecting length among optical fibers, even if the polishing process at the end face of the optical connector is omitted.

The optical connector disclosed in Patent Literature 4 includes a fiber holder in which a plurality of guide holes for guiding a plurality of optical fibers are formed, a space that connects the plurality of guide holes and accommodates the plurality of optical fibers, and a deformable member that forms at least a part of the fiber holder and causes the space to be deformed to allow a part or all of the plurality of optical fibers to bend in the space.

Patent Literature 5 (Japanese Patent Laid-Open No. 1993-60949) discloses a multi-fiber optical connector that can switch a line from a main line to a spare line (or vice versa) only by reversing one of a pair of multi-fiber optical connectors which are in a connected state, and can perform line switching in a very short period of time without the need to check the core wires on the main line side and the spare line side.

In the multi-fiber optical connector disclosed in Patent Literature 5, two rows of optical fiber insertion holes are provided between two pin holes extending parallel to each other into which respective guide pins are inserted, the two rows being formed with the same number of optical fiber insertion holes lined up at the same pitch so as to be symmetrical with respect to a plane P including a center axis line of the two pin holes and to be also symmetrical with respect to a plane Q perpendicular to the plane P and passing through the centers of the two pin holes.

CITATION LIST

Patent Literature

Patent Literature 1: Japanese Patent Laid-Open No. 2001-108867.

Patent Literature 2: Japanese Patent Laid-Open No. 2004-86069.

Patent Literature 3: Japanese Patent Laid-Open No. 2007-286354.

Patent Literature 4: Japanese Patent Laid-Open No. 2012-194481.

Patent Literature 5: Japanese Patent Laid-Open No. 1993-60949.

SUMMARY OF INVENTION

Technical Problem

In the optical connector or the optical connector ferrule disclosed in the above-described Patent Literatures 1 to 4, there are disclosed technologies for improving dimensional accuracy and enhancing characteristics such as mechanical strength.

In particular, Patent Literature 2 discloses the optical connector in which light is not transmitted between the optical fibers even when the optical connector is erroneously connected to an MT connector. Accordingly, the optical connector of Patent Literature 2 has no connection compatibility.

Additionally, Patent Literature 5 discloses a multi-fiber optical connector in which two rows in which optical fiber insertion holes are lined up are provided to be symmetrical with respect to a plane perpendicular to the plane P passing through the centers of the two pin holes. Since this multi-fiber optical connector enables a switch connection between one row for a main line and the other row for a spare line, it has lower connection density rather than the existing connectors, and the pitch at the center part is neither twice the other pitch nor has connection compatibility.

In recent years, the high-density packaging and space saving have been demanded for an ultra-compact connector. Furthermore, the compatibility with an existing multi-fiber push on (MPO) connector has been also demanded.

An object of the present invention is to provide a multi-fiber optical ferrule and a multi-fiber optical connector that can achieve low loss and high density even in optical fibers having a cladding diameter of 80 μm, and have connection compatibility with conventional optical connectors.

Another object of the present invention is to provide a multi-fiber optical ferrule and a multi-fiber optical connector that allow high-density and high-speed, large-capacity communication while having connection compatibility with conventional optical connectors.

A still another object of the present invention is to provide a multi-fiber optical ferrule and a multi-fiber optical connector that have low connection loss even in optical fibers having a cladding diameter of 80 μm, and have low quality variation.

Solution to Problem (1) A multi-fiber optical ferrule according to one aspect comprises a main body made of a resin composition, a plurality of optical fiber insertion holes which are provided in the main body and into which optical fibers are inserted, and two guide pin holes which are provided in the main body and into which guide pins are inserted, wherein the optical fiber insertion holes comprise 24 or more holes and are provided on a straight line connecting the two guide pin holes, the optical fiber insertion holes have a small diameter portion and a large diameter portion, an internal diameter of the small diameter portion is 81 μm, and a pitch Pm for the optical fiber insertion holes at a center part is twice a pitch P for the optical fiber insertion holes other than the optical fiber insertion holes at the center part.

A cladding diameter of the optical fiber currently mainly used is 125 μm, and an external diameter of the coating that protects the optical fiber is 250 μm. In order to improve communication density, a multi-fiber optical ferrule for 12 fibers is currently mainly used in which 12 optical fibers are bundled up in a tape shape and connected as a multi-fiber optical fiber cable. In order to connect this multi-fiber optical ferrule for 12 fibers, a multi-fiber optical ferrule in which a pitch of the optical fibers is 250 μm is used as a standard.

Furthermore, in order to achieve high-density information communication by further increasing the number of optical fibers, a multi-fiber optical ferrule for 24 fibers has been developed in which two rows are formed and each in which 12 optical fibers are provided at a pitch of 250 μm. Additionally, a multi-fiber optical ferrule for 16 fibers has been developed in which 16 optical fibers are bundled up and the plurality of optical fibers are provided in one row and at a pitch of 250 μm. In recent years, in order to achieve further higher density packaging, an optical fiber having a coating thickness of 200 μm or 180 μm has been also developed, and in this case, an optical fiber tape having 16 fibers provided at a pitch of 200 μm has been also studied.

On the other hand, in recent years, higher-density and higher-speed, larger-capacity communication has been demanded, and it has been studied that a cladding diameter of the optical fiber is set to 80 μm to increase the number of optical fibers. In particular, this is because it is necessary to perform high-speed, large-capacity communication at higher density than ever in a narrow environment, in order not only to use the optical fibers for long distance communication but also to package the optical fibers on a board as optical wiring in a computer such as a server.

However, when a bundle of 12 optical fibers having a cladding diameter of 80 μm are lined up in each of two rows to connect 24 fibers, it is difficult to obtain high accuracy due to a mold structure, which leads to an increase in connection loss. Additionally, this leads to an increase in variations of product quality as the number of optical fibers increases.

In the case where the number of rows in which a bundle of 12 optical fibers are lined up is one, CH1 to CH12 are lined up in one row, and the same CHs can be connected to each other even when connectors are connected by reversing one of the connectors, but in the case where the number of rows in which a bundle of 12 optical fibers are lined up is two, CH1 and CH13 are connected to each other, which results in unstable optical characteristics.

Therefore, in the present invention, it is developed to provide a multi-fiber optical ferrule having connection compatibility with conventional connectors while being capable of achieving high-density packaging with low loss by designing a pitch Pm for optical fiber insertion holes at a center part to be twice a pitch P for optical fiber insertion holes other than those at the center part while providing optical fibers having an external diameter of 80 μm in one row to improve a positional accuracy of each optical fiber.

That is, according to the multi-fiber optical ferrule of the present invention, the pitch P is set to ½ of the conventional standard, whereby odd-numbered optical fibers from the center perform communication as it is in the communication system of the conventional standard, and even-numbered optical fibers located between the odd-numbered optical fibers from the center serve as newly added optical fibers, thereby achieving high-density communication. In this case, the newly added optical fibers may perform communication in the communication system of the conventional standard, or may perform communication in a communication system different from the conventional standard. For example, when the added optical fibers perform communication in the system of the conventional standard, the communication density can be doubled, and when they perform communication in high frequency and multiplex communication system and the like as a new standard, more than two times information can be communicated.

In this way, the multi-fiber optical ferrules of the present invention can maintain connection compatibility with the multi-fiber optical ferrules of the existing standard, and in case connected to each other, can provide a multi-fiber optical ferrule capable of achieving high speed and high-density packaging. This makes it easy to connect the existing optical fibers for long distance communication with the optical fibers packaged on the board.

In this way, according to the present invention, there can be provided a multi-fiber optical ferrule having connection compatibility with the conventional standard while achieving high density with low loss using optical fibers having a cladding diameter of 80 μm.

In the case where the number of rows in which a bundle of 12 optical fibers are lined up is two, CH1 and CH13 are connected to each other when the connectors are connected by reversing one of the connectors, whereas according to the present invention, all the CHs are lined up in one row, and thus the same CHs can be connected, which makes it possible to provide stable optical characteristics.

Note that when the internal diameter of the small diameter portion is set to 81 μm, a slight clearance having a radius of 0.5 μm is generated between the small diameter portion and the optical fiber having a cladding diameter of 80 μm, and therefore an adhesive is filled into the clearance, which makes it possible to securely fix the optical fiber to the ferrule while accurately ensuring positional accuracy of a connection end face of the optical fiber.

That is, to fit and fix the optical fibers to the multi-fiber optical ferrule, the adhesive is filled into the large diameter portion side of each of the optical fiber insertion holes, and the optical fibers are inserted into the respective optical fiber insertion holes. Then, the adhesive is pushed into the small diameter portion together with the optical fiber to be inserted, and in the small diameter portion, the adhesive fills the clearance having a radius of 0.5 μm. Then, the adhesive is shrunk when being cured, whereby a center axis of the small diameter portion 110 of the optical fiber insertion hole 103 can coincide accurately with a center axis of the optical fiber.

(2) A multi-fiber optical ferrule according to a second invention may be the multi-fiber optical ferrule according to the invention of one aspect in which the number of the optical fiber insertion holes provided is 24, and the pitch P is 125 μm.

This makes it possible to have high connection compatibility with general-purpose multi-fiber optical ferrules.

That is, the multi-fiber optical ferrules currently generally used include a 12-MT ferrule in which 12 fibers are lined up in one row at a pitch of 250 μm, and a 16-MT ferrule in which 16 fibers are lined up in one row at a pitch of 250 μm. Accordingly, providing a multi-fiber optical ferrule in which 24 fibers are lined up in one row at a pitch P of 125 μm makes it possible to have high connection compatibility with existing general-purpose multi-fiber optical ferrules.

Specifically, in the case where a 24-fiber optical fiber cable is connected, it is preferable that the pitch at the center part is 250 μm and the pitch for the optical fiber insertion holes other than those at the center part is 125 μm. In this way, when the pitch for the optical fiber insertion holes at the center part is 250 μm and the pitch for the optical fiber insertion holes other than those at the center part is 125 μm, the optical fibers having twice the spacing (12 optical fibers provided at the pitch of 250 μm) have the same arrangement and communication system as the conventional 12-fiber optical fiber cable, and therefore has compatibility with the conventional 12-fiber optical fiber cable, and 12 optical fibers located between the optical fibers having twice the spacing serve as added optical fibers, which makes it possible to perform high-density communication.

Accordingly, the multi-fiber optical ferrule can be obtained that can perform communication with low loss and high-density packaging while having connection compatibility with conventional optical connectors.

(3) A multi-fiber optical ferrule according to a third invention may be the multi-fiber optical ferrule according to the invention of one aspect in which the number of the optical fiber insertion holes provided is 32, and the pitch P is 125 μm.

This makes it possible to have high connection compatibility with general-purpose multi-fiber optical ferrules.

That is, the multi-fiber optical ferrules currently generally used include a 12-MT ferrule in which 12 fibers are lined up in one row at a pitch of 250 μm, and a 16-MT ferrule in which 16 fibers are lined up in one row at a pitch of 250 μm. Accordingly, providing a multi-fiber optical ferrule in which 32 fibers are lined up in one row at a pitch P of 125 μm makes it possible to have high connection compatibility with existing general-purpose multi-fiber optical ferrules.

Specifically, in the case where a 32-fiber optical fiber cable is connected, it is preferable that the pitch at the center part is 250 μm and the pitch for the optical fiber insertion holes other than those at the center part is 125 μm. In this way, when the pitch for the optical fiber insertion holes at the center part is 250 μm and the pitch for the optical fiber insertion holes other than those at the center part is 125 μm, the optical fibers having twice the spacing (16 optical fibers provided at the pitch of 250 μm) have the same arrangement and communication system as the conventional 16-fiber optical fiber cable, and therefore has compatibility with the conventional 16-fiber optical fiber cable, and 16 optical fibers located between the optical fibers having twice the spacing serve as added optical fibers, which makes it possible to perform high-density communication.

Accordingly, the multi-fiber optical ferrule can be obtained that can perform communication with low loss and high-density packaging while having connection compatibility with conventional optical connectors.

(4) A multi-fiber optical ferrule according to a fourth invention may be the multi-fiber optical ferrule according to any one of the inventions of one aspect to the third invention in which an internal diameter of the large diameter portion is 100 μm, and a distance of the small diameter portion is 0.5 mm.

(5) A multi-fiber optical ferrule according to a fifth invention may be the multi-fiber optical ferrule according to the inventions of one aspect to the fourth invention in which the internal diameter of the small diameter portion has a plus-side tolerance of within 10% and a minus-side tolerance of within 5%, the pitch P for the optical fiber insertion holes has a tolerance of within ±5%, and a bending angle of the optical fiber insertion hole is not more than 0.5°.

This enables connection with low loss even using the optical fibers having a cladding diameter of 80 μm.

When the internal diameter of the small diameter portion is set to have a plus-side tolerance of within 10% and a minus-side tolerance of within 5% (that is, within a range of from +10 to −5%), the clearance of 0.5 μm can be ensured in the narrow clearance provided in the small diameter portion, whereby the adhesive can securely fill the clearance. This makes it possible to fix the optical fiber in the connection end face with high positional accuracy.

In this case, the plus-side tolerance of the internal diameter of the small diameter portion is preferably not more than +10%, more preferably not more than +8%, and further preferably not more than +5%. Additionally, the minus-side tolerance is preferably not less than −5%, more preferably not less than −2%, and further preferably not less than 0%.

The bending angle of the optical fiber insertion hole refers to an angle formed between a line perpendicular to the connection end face and a center line of the optical fiber insertion hole viewed from a depth position in a range of from not less than 0.3 mm to not more than 0.5 mm from the end face of the multi-fiber optical ferrule.

Setting this bending angle of the optical fiber insertion hole to not more than 0.5° enables secure connection when the multi-mode optical communication is performed. Additionally, setting the bending angle of the optical fiber insertion hole to not more than 0.3° enables connection with low loss even when the single-mode optical communication is performed.

(6) A multi-fiber optical ferrule according to a sixth invention may be the multi-fiber optical ferrule according to the inventions of one aspect to the fifth invention in which the main body is an integrally formed body of a resin composition containing polyphenylene sulfide.

In this case, the main body comprises a resin composition mainly containing polyphenylene sulfide, whereby the dimensions can be maintained with high accuracy. This can prevent the position deviation of the optical fiber, and can prevent an adverse effect on connection loss and the like. Furthermore, even when electronic components on the board are subjected to temperature changes due to operation, characteristics such as connection loss are not changed.

Accordingly, even when optical wiring is mounted on the board, a multi-fiber optical connector ferrule with low connection loss can be provided. Note that in this specification, the multi-fiber optical connector ferrule may be simply referred to as a ferrule or an MT ferrule.

(7) A multi-fiber optical ferrule according to a seventh invention may be the multi-fiber optical ferrule according to the inventions of one aspect to the sixth invention in which the main body is installed on a photoelectric conversion element provided on a board, or an optical transceiver.

In this case, the multi-fiber optical ferrule is installed on the photoelectric conversion element on a circuit board or the optical transceiver, whereby the multi-fiber optical ferrule can be directly connected to the optical fibers. This enables optical packaging at a position closer to the electronic components (such as a CPU) on the circuit board. The high-density optical packaging can be achieved at a position to the electronic components, which makes it possible to perform high-speed, large-capacity information processing.

In this case, the multi-fiber optical ferrule on the board side has connection compatibility, and therefore, a ferrule on the optical fiber side may be an existing ferrule or the multi-fiber optical ferrule of the present invention. This can provide an optical packaging board having connection compatibility.

(8) A multi-fiber optical connector according to another aspect is a connector in which optical fibers are connected to the multi-fiber optical ferrule according to the inventions of one aspect to the seventh invention.

In this case, the multi-fiber optical connector has connection compatibility with the existing optical connector, whereby the multi-fiber optical connector can be obtained which can perform optical communication and can perform communication with high-density packaging.

In the optical connector which achieves high density with optical fibers having a small diameter, when the positional relationship among all the optical fibers slightly deviates from the design, the malfunction of the communication occurs. In particular, providing optical fibers in a plurality of rows causes complication of the mold structure, which makes it impossible to obtain positional accuracy of the optical fibers.

Therefore, in the multi-fiber optical connector according to the present invention, the maximum fiber hole bending angle can be achieved with not more than 0.5 degrees. Furthermore, the maximum angle is preferably not more than 0.3 degrees. Additionally the multi-fiber optical connector has a plurality of guide pin holes to achieve miniaturization, and further suppress or prevent deviation. Thus achieving miniaturization enables high-density and high-speed, large-capacity optical communication to be directly introduced into the board (or to the vicinity of the board), can achieve an optical packaging circuit without through the electrical wiring, and maintain the compatibility with the current multi-fiber optical connectors.

(9) A method of manufacturing the multi-fiber optical ferrule according to another aspect is a method of manufacturing the multi-fiber optical ferrule according to the inventions of one aspect to the seventh invention, wherein the main body is formed by injecting the resin composition into a cavity formed between an upper mold and a lower mold, and a plurality of the optical fiber insertion holes is formed by a plurality of mold pins sandwiched between the upper mold and the lower mold.

This makes it possible to maximally suppress a pitch for a plurality of optical fiber insertion holes and/or an inclination error in the multi-fiber optical ferrule. For example, in the case where a plurality of optical fiber insertion holes are formed in two rows, the mold structure for forming the plurality of optical fiber insertion holes is complicated, which makes it impossible to stably form the pitch for the plurality of optical fiber insertion holes and/or the fiber hole bending angle.

That is, in case the plurality of optical fiber insertion holes are lined up in one row (one-dimensional array), a plurality of mold pins are firmly held by a pair of molds (an upper mold and a lower mold), and a resin composition is injected into the cavity formed between the pair of molds to thereby form the main body, and the optical fiber insertion holes are formed in pull-out traces of the plurality of mold pins, which makes it possible to maximally suppress an error of the fiber hole bending angle.

BRIEF DESCRIPTION OF DRAWINGS

FIG. 1 is one example of a diagram illustrating a front view, a plan view, a bottom view, a right side view, and a left side view of a ferrule of the present embodiment.

FIG. 2 is a left side view of FIG. 1.

FIG. 3 is a cross-sectional view taken along line A-A' of FIG. 1 (*b*).

FIG. 4 is a schematic diagram for explaining the ferrule of the present embodiment.

FIG. 5 is a schematic diagram illustrating an example of an optical module packaged on a board.

FIG. 6 is a schematic diagram for explaining one example of compatibility between a 24-fiber optical connector of the present embodiment and an existing 12-fiber optical connector.

FIG. 7 is a schematic cross-sectional view for explaining a method of manufacturing the ferrule of the present embodiment.

FIG. 8 is a schematic diagram for explaining a method of manufacturing a conventional MT ferrule (two rows).

DESCRIPTION OF EMBODIMENTS

Hereinafter, embodiments of the present invention will be described with reference to the drawings. A plurality of embodiments are illustrated as the embodiments of the present invention, but each embodiment may be implemented alone or in combination with one or more embodiments.

In the following description, identical components are denoted by identical reference characters. Their names and functions are also identical. Accordingly, they will not be described repeatedly in detail.

Embodiments

FIG. 1 is one example of a diagram in which (a), (b), (c), (d), and (e) illustrate a front view, a plan view, a bottom view, a right side view, and a left side view of a ferrule 100 of the present embodiment, respectively, and FIG. 2 is (e) of FIG. 1, that is, a left side view of the present embodiment (an enlarged view of the left side view turned by 90° in the counterclockwise direction). FIG. 3 is a cross-sectional view taken along line A-A' of FIG. 1 (*b*), and FIG. 4 is a schematic diagram for explaining the ferrule 100 of the present embodiment.

The multi-fiber optical ferrule 100 (hereinafter also referred to simply as the ferrule 100) is a principle component forming a multi-fiber optical connector, and the ferrules 100 are provided in both of an end face of one optical fiber and an end face of the other optical fiber to accurately adjust positions of connection end faces of the respective optical fibers and apply a contact force to optically connect the optical fibers.

The ferrule 100 enables simultaneous connection of a plurality of optical fibers, and can be formed by molding a resin composition containing polyphenylene sulfide (hereinafter referred to as PPS) with a mold.

The ferrule 100 is an integrally molded product (main body) that includes optical fiber insertion holes 103 for optical fibers 11, and guide pin holes 102 for inserting guide pins, and is made of a resin composition containing polyphenylene sulfide.

Ferrule 100

As illustrated in FIGS. 1 to 3, the ferrule 100 of the present embodiment is provided with a fiber tape receiving port 101 into which an optical fiber tape is inserted, and a plurality of optical fiber insertion holes 103 into which the optical fibers 11 from which the coating has been removed are inserted and arranged are provided to communicate with the fiber tape receiving port 101. Furthermore, the ferrule 100 is provided with the guide pin holes 102 for positioning and connecting a multi-fiber optical connector 12, the guide pin holes 102 passing through the ferrule 100 in parallel to the optical fiber insertion holes 103.

In the ferrule 100 of the present embodiment, an opening 104 is formed as an adhesive filling port into which an adhesive is filled. The opening 104 is provided at a substantially center part of an upper surface of the ferrule 100 so that the adhesive is filled thereinto.

The optical fiber tape in which the coating has been removed from its distal end portion is inserted into the fiber tape receiving port 101 from a rear side of the ferrule 100, the plurality of exposed optical fibers 11 are inserted into the respective optical fiber insertion holes 103, and are fixed with the adhesive filled into the opening 104. After the optical fibers 11 are inserted into the ferrule 100, the connection end faces of the optical fibers 11 are fixed with the cured adhesive, and are polished together with a connection face of the ferrule 100.

A leading portion of the fiber tape receiving port 101 of the ferrule is protected by a boot formed of an elastic material such as rubber or a synthetic resin, and the optical fibers 11 are pulled out therefrom. The boot is fixed to a boot insertion hole of the fiber tape receiving port 101 of the ferrule 100 with an adhesive.

In the ferrule 100 of the present embodiment, the optical fiber insertion holes 103, the fiber tape receiving port 101, and the opening 104 communicate with each other. A support part 105 is provided below a filling part into which this adhesive is filled, and in the support part 105, guide grooves are formed to guide and lead the optical fibers to the optical fiber insertion holes 103. The guide grooves of the present embodiment communicate with rear ends of the optical fiber insertion holes 103, are parallel to each other and each have a shape having a semicircular cross-section.

As the optical fiber tape attached to the ferrule 100, there can be used an optical fiber tape core wire in which optical fiber element wires on which the coating has been applied are integrated by common coating or an optical fiber ribbon cord and the like in which protective coating is further applied on the optical fiber tape core wire.

Guide Pin Hole 102

Guide pins (not illustrated) are previously inserted into and fixed to the guide pin holes 102 in one ferrule 100 forming the multi-fiber optical connector, and these guide pins are inserted into the guide pin holes 102 in the other ferrule 100 so that the connection faces of the multi-fiber optical connectors 12 abut against each other, whereby the optical fibers 11 are connected.

In the ferrules 100 thus configured, the axes of the optical fibers 11 are positioned by the guide pins, and the connection faces abut against each other with a binding clip or the like, whereby optical connection is performed. Accordingly, the ferrule 100 is provided with two guide pin holes 102 having a predetermined guide pitch Pg.

A guide pin diameter is preferably 0.7 mm or 0.55 mm, and the guide pitch is preferably 4.6 mm or 5.3 mm.

Considering that the guide pin having a diameter of 0.7 mm is widely used in the existing MT ferrule, the guide pin diameter is preferably 0.7 mm from the viewpoint of connection compatibility. The guide pin having a diameter of 0.7 mm has higher reliability and higher positioning accuracy than a guide pin having a diameter of 0.55 mm.

The guide pin hole 102 of the present embodiment has an internal diameter of 0.699 mm, and the guide pin having a diameter of 0.700 mm is inserted into this guide pin hole 102. This makes it possible to have connection compatibility with the conventional optical connectors and also to improve the connection reliability.

The guide pitch Pg of the pair of guide pin holes 102 according to the present embodiment is 4.6 mm. The magnitude of the guide pitch Pg is not limited to a particular value, but is preferably a guide pitch Pg which is widely used in the existing MT ferrule, from the viewpoint of connection compatibility.

Examples of the optical fiber 11 can include a single-mode optical fiber or a multi-mode optical fiber. The optical fiber 11 is standardized in ITU-T (International Telecommunication Union Telecommunication Standardization Sector) and IEC (International Electrotechnical Commission), and when the optical fiber 11 is made of quartz glass most commonly used as a material, the optical fiber 11 is defined to have a cladding diameter of 125 μm±1 μm and 80 μm±1 μm. The optical fiber 11 having a cladding diameter of 125 μm is currently mainly used, but in the future, with increase in demand for high-density packaging, the optical fiber 11 having a cladding diameter of 80 μm is expected to be used. Accordingly, in the present embodiment, the optical fiber having a nominal cladding diameter of 80 μm is used. For the optical fiber insertion holes 103 of the ferrule 100, for example, 16-fiber, 24-fiber, 32-fiber, or 60-fiber optical fiber cable can be applied.

The MT connector of the present embodiment (JIS C 5981) is cabled using the ferrule 100 (JIS C 5964-5), and can be connected by a positioning pin connection method. The ferrule 100 of the present embodiment conforms to the existing pin connection method standard, and therefore can be connected using the conventional connection components and has connection compatibility with the existing MT ferrule. And it can be also connected to the optical transceiver and the like, so the optical packaging on a board 14 can be implemented.

Opening 104

The optical fibers 11 are used as a tape core wire in which a plurality of optical fibers are bundled up in a tape shape, and an outer coating layer of the tape core wire is removed by a predetermined terminal length so that the optical fibers 11 are exposed, the exposed optical fibers 11 are inserted into the ferrule 100 and supported at a specified pitch for connection. The ferrule 100 may have a substantially rectangular parallelepiped shape having a stepped portion provided outside, and one end face side thereof is provided with the fiber tape receiving port 101 configured to receive a tape core wire in the ferrule 100, and a support part 105 configured to support the optical fibers 11.

The opening 104 is formed on the upper end face of the ferrule 100 to establish communication between an interior space and the outside, and as illustrated in FIG. 2, at a position vertically above the face into which the adhesive is filled, the opening 104 is opened in a rectangular shape so that the interior space can be seen.

The opening 104 is used to visually check that the optical fibers 11 are inserted into the support part 105 and to serve as a filling port from which the adhesive is poured to fix the optical fibers 11. The filling port (opening) 104 may have any shape by which the optical fiber insertion holes 103 can be seen.

Optical Fiber Insertion Hole 103

The optical fiber insertion holes 103 each are a hole passing from an insertion face of the support part 105 to the connection face, and the adjacent holes are formed to be parallel to each other.

An axis of each of the optical fiber insertion holes 103 is provided perpendicularly to the connection end face of the ferrule 100, so that the connection end faces of the optical fibers accurately abut against each other on the same axis.

The angle of the optical fiber insertion hole 103 with respect to the connection end face is quantified as a bending angle. The bending angle of the optical fiber insertion hole 103 refers to an angle formed between a line perpendicular to the connection end face and a center line of the optical fiber insertion hole viewed from a depth position in a range of from not less than 0.3 mm to not more than 0.5 mm from the end face of the ferrule 100.

This bending angle of the optical fiber insertion hole is preferably not more than 0.5°. This enables secure connection when the multi-mode optical communication is performed. Additionally, the bending angle of the optical fiber insertion hole is preferably not more than 0.3°. This enables connection with low loss when the single-mode optical communication is performed.

The bending angle in the present embodiment is a value measured as follows. That is, a fiber hole position deviation amount in the end face of the ferrule 100 is measured by a two/three-dimensional automatic dimension measuring device. To measure the fiber hole position deviation amount, an intersection of a line connecting center points of two guide holes and its perpendicular bisector is set as a coordinate (0, 0), and a position of each fiber hole is measured, and a difference between a measured value and a design value is calculated as a position deviation amount.

Furthermore, also at a depth position in a range of from not less than 0.3 mm to not more than 0.5 mm from the end face, the fiber hole position deviation amount is calculated by the same method as the above-described method.

In this way, the fiber hole bending angle is calculated based on a difference between the fiber hole position deviation amount in the end face and the fiber hole position deviation amount at a predetermined depth position.

Note that the relationship between the connection end face of the ferrule 100 of the present embodiment and the optical fiber insertion holes 103 are as described above, but at a site where the two ferrules 100 abut against each other to perform optical connection, the connection end faces of the ferrules 100 may be polished to form an inclination angle of 8° in order to reduce a reflection loss.

In this case, the connection end faces are inclined obliquely, but the two ferrules 100 abut against each other on a line by the guide pins, and the optical fibers 11 in the ferrules 100 are optically connected to each other on a line.

The optical fiber insertion hole 103 has a large diameter portion 106 and a small diameter portion 110 formed so that the diameter thereof is gradually reduced from a proximal end side toward a distal end side of the optical fiber 11 to be inserted.

In the present embodiment, when the internal diameter of the small diameter portion 110 is set to 81 μm, a clearance having a radius of 0.5 82 m is generated between the small diameter portion 110 and the optical fiber having a cladding diameter of 80 μm, and therefore, an adhesive is filled into the clearance, which makes it possible to securely fix the optical fiber while accurately ensuring positional accuracy of the connection end face of the optical fiber.

That is, to fit and fix the optical fibers to the ferrule 100, the adhesive is applied to the vicinity of the guide grooves, and the optical fibers are inserted. Then, the adhesive is pushed into the small diameter portion 110 from the large diameter portion 106 together with the optical fiber to be inserted, and in the small diameter portion 110, the adhesive fills the clearance having a radius of 0.5 μm. Then, the adhesive is shrunk when being cured, whereby a center axis of the small diameter portion 110 of the optical fiber insertion hole can coincide accurately with a center axis of the optical fiber.

Note that the internal diameter of the optical fiber insertion hole 103 can be changed appropriately according to the cladding diameter of the optical fiber to be inserted, and for example, when the optical fiber having a cladding diameter of 50 μm is used, the internal diameter of the small diameter portion 110 may be set to 51 μm and the internal diameter of the large diameter portion 106 may be set to 80 μm.

Board Packaging

FIG. 5 illustrates an example of a schematic diagram of an optical module packaged on the board 14. The ferrule 100 is installed in the multi-fiber optical connector 12, and the multi-fiber optical connector 12 is fixed directly on the board 14 or to the vicinity of the board 14, and is connected to a photoelectric conversion element 13 via the optical fiber 11.

A partner connected to the ferrule 100 of the present embodiment is not limited to a particular component, and for example, the ferrule 100 is connected to the existing MT ferrule 200 and an optical fiber 11' extending from the MT ferrule 200 is arranged on the case 10 side.

For optical packaging on the board 14 of the electronic circuit, the optical transceiver having the photoelectric conversion element 13 may be provided on an end of the board 14 to connect to the multi-fiber optical connector 12 (FIG. 5). Examples of the optical transceiver include a light receiving element and a light emitting element housed as a photoelectric conversion element in a device holder together with lens. In this device holder type optical transceiver, a lead of the photoelectric conversion element 13 (or its FPC) is soldered to the board 14, and is connected to the ferrule 100 attached to a receptacle fixed to the board 14.

This enables optical wiring to be packaged on the board in a computer such as a server, or connection to the optical fibers for a long-distance communication between the computers.

A connector of the ferrule 100 used as the multi-fiber optical connector 12 is not limited to a particular connector, and for example, a lightray MPX connector, an MT-RJ connector, an MPO connector, and the like can be used.

The ferrule 100 of the present embodiment can be connected as the multi-fiber optical connector 12 using a general MPO housing (JIS C 5982, IEC 61754-7 series), or the like. In the housing, a pressing spring for mechanically connecting the optical fibers 11 may be incorporated. Thus, the push-pull operation allows for easy attachment and detachment.

The main body of the ferrule 100 can be obtained by, for example, transfer molding using a thermosetting resin such as an epoxy resin, or injection molding using a thermoplastic resin such as a polyphenylene sulfide resin (PPS) or a liquid crystal polymer (LCP).

The ferrule 100 of the present embodiment is formed by molding a resin composition containing PPS as a main component. The resin composition can contain an inorganic filler in addition to PPS. The inorganic filler can contain silica particles and a fiber filler.

Connection Compatibility

FIG. 6 is a schematic diagram for explaining connection compatibility between the ferrule 100 according to the present embodiment and an existing 12-fiber MT ferrule 90.

As the MT ferrule 90 currently generally used, a 12-MT ferrule 90 in which 12 fibers are lined up in one row at a pitch of 250 μm is widely used, and in recent year, a 16-MT ferrule in which 16 fibers are lined up in one row at a pitch of 250 μm has been also developed. Accordingly, providing a multi-fiber optical ferrule in which 24 fibers or 32 fibers are lined up in one row at a pitch P of 125 μm makes it possible to have high connection compatibility with existing general-purpose MT ferrule 90.

As illustrated in FIG. 6, in the multi-fiber optical connector 12 according to the present embodiment, the pitch Pm for the optical fibers 11 at the center part is 250 μm, and the pitch P for the optical fibers other than those at the center part is 125 μm. That is, the pitch Pm at the center part is designed to be twice the other pitch P.

The guide pin diameter of the ferrule 100 of the present embodiment is ϕ0.7 mm, the guide pitch Pg of the pair of guide pin holes 102 is 4.6 mm, and they are identical to those of the existing MT ferrule 90.

With such arrangement, end faces of the odd-numbered optical fibers from the center are optically connected to the fiber end faces of the existing MT ferrule 90, whereby the communication can be performed as it is in the communication system of the conventional standard. The even-numbered optical fibers from the center serve as newly added optical fibers which are not included in the existing MT ferrule 90. Therefore, when the multi-fiber optical connectors 12 of the present embodiment are connected to each other, the high-density optical communication including the newly added optical fibers can be achieved.

In this case, the newly added even-numbered optical fibers may perform communication in the communication system of the conventional standard, or may perform communication in a communication system different from the conventional standard. For example, when the added optical fibers perform communication in the system of the conventional standard, the communication density can be doubled, and when they perform communication in high frequency and multiplex communication system and the like as a new standard, more than two times information can be communicated.

Accordingly, the ferrule 100 of the present embodiment can achieve high-speed, high-density optical communication, and has connection compatibility with the existing MT ferrule 90, which enables communication between the ferrules 100 and 90.

An example of compatible connection between the ferrule 100 according to the present embodiment and the existing MT ferrule 90 will be described in detail using the enlarged view of FIG. 6.

The ferrule 100 of the present embodiment and the existing MT ferrule 90 can use the guide pins to easily achieve positioning. In this case, an optical fiber 11*b* of the ferrule 100 of the present embodiment and an optical fiber 91*a* of the existing MT ferrule 90 are connected to each other, an optical fiber 11*d* and an optical fiber 91*b* are connected to each other, and an optical fiber 11*f* and an optical fiber 91*c* are connected to each other. Furthermore, an optical fiber 11*h* of the ferrule 100 of the present embodiment and an optical fiber 91*d* of the existing MT ferrule 90 are connected to each other, an optical fiber 11*j* and an optical fiber 91*e* are connected to each other, an optical fiber 11*m* and an optical fiber 91*f* are connected to each other, and an optical fiber 11*n* and an optical fiber 91*g* are connected to each other.

As a result, the existing 12-fiber MT ferrule 90 and the ferrule 100 of the present embodiment are optically connected to each other, which enables communication between the ferrules 90 and 100. In the ferrule 100 of the present embodiment, the optical fibers 11 are arranged symmetrically, and therefore, even when the ferrule 100 is turned upside down, the communication can be achieved. In this way, the compatibility between the existing MT ferrule 90 and the ferrule 100 of the present embodiment can be maintained reliably.

When the ferrule 100 of the present embodiment and the ferrule 100 of the present embodiment are connected to each other, the communication by the 24-fiber optical fibers 11 can be achieved, whereby large-capacity communication can be achieved.

In particular, the optical fibers 11*a*, 11*c*, 11*e*, 11*g*, 11*i*, and 11*k* of the ferrule 100 of the present embodiment are the optical fibers 11 connected only to the ferrule 100 of the present embodiment, and are not connected to the existing MT ferrule 90, and therefore, they can use the same communication system as the existing MT ferrule 90 or new communication system.

Accordingly, the ferrule 100 of the present embodiment can achieve high-speed, high-density optical communication, and has connection compatibility with the existing MT ferrule 90, which enables communication between the ferrule 100 and 90.

In recent years, in order to achieve further higher density packaging, an optical fiber having a coating thickness of 200 μm or 180 μm has been also developed, and in this case, an optical fiber tape having 16 fibers provided at a pitch of 200 μm has been also studied.

In this case, the pitch Pm at the center part of the ferrule 100 is 200 μm, and the pitch P at parts other than the center part is 100 μm. The internal diameter of the large diameter portion may be 90 μm.

Manufacturing Method

FIG. 7 is a schematic diagram illustrating a method of manufacturing the ferrule 100 of the present embodiment. The reason why the optical fibers 11 are arranged in a line will be described.

As illustrated in FIG. 7, the optical fiber insertion hole 103 is formed from the support part 105 configured to support the optical fiber 11, and the optical fiber insertion hole 103 has the large diameter portion 106 and the small diameter portion 110 formed so that the diameter thereof is gradually reduced from a proximal end side toward a distal end side of the optical fiber to be inserted.

The guide groove of the support part 105 is formed with a curvature of 100 μm in diameter, the large diameter portion 106 of the fiber insertion hole 103 is formed with a curvature of ϕ100 μm, and the small diameter portion 110 of the fiber insertion hole 103 is formed with a curvature of ϕ81 μm.

In this case, since the internal diameter of the large diameter portion 106 is less than 160 μm, only one optical fiber 11 having a cladding diameter of 80 μm can be inserted into each fiber insertion hole 103, which makes it possible to securely avoid occurrence of a problem in that two or more optical fibers 11 are inserted into one fiber insertion hole 103. It is only required that only the internal diameter of the large diameter portion 106 is thus defined, which does not need a special configuration, and therefore the configuration of the ferrule 100 is not complicated.

The guide grooves of the support part 105 communicate with the rear ends of the large diameter portions 106, are parallel to each other, and each are formed to have a semicircular cross-section. The plurality of guide grooves are configured to guide the optical fibers 11 inserted from the rear face side of the ferrule 100 to the respective fiber insertion holes 103.

The curvature of the guide groove in the present embodiment is 100 μm which is the same as the internal diameter of the large diameter portion 106, and therefore, the end face of the optical fiber provided in the guide groove is smoothly guided into the corresponding fiber insertion hole 103 as it is.

Here, FIG. 8 illustrates an example of a mold for manufacturing the existing MT ferrule. In the recent years, in order to increase the communication capacity and communication speed, a 24-fiber MT ferrule in which 12 optical fibers are lined up in each of two rows has been developed as a method of increasing the density of the optical fibers. FIG. 8 illustrates an example of a mold for manufacturing the existing 24-fiber MT ferrule.

As illustrated in FIG. 8, a pin mold for forming the fiber insertion holes 103 is held while performing accurate positioning by pin holders as illustrated in FIG. 8 (*b*). However, when the fiber insertion holes 103 are lined up in two rows, as illustrated in FIG. 8 (*b*), it is necessary to hold the pin mold by pin holders stacked in three stages, which causes reduced accuracy compared with the case of one stage.

When the optical fiber having a cladding diameter of 125 μm is used as in the conventional manner, the fiber insertion holes 103 are lined up in two rows, and therefore there has no problem eve when three-stage pin holders as illustrated in FIG. 8 (b) are used, but when the optical fiber having a cladding diameter of 80 μm is used, the problem of this accuracy becomes nonnegligible.

That is, when the optical fibers having a cladding diameter of 80 μm are lined up in two rows to connect 12 fibers, it is difficult to maintain high positional accuracy and angle accuracy of the optical fiber insertion hole 103 in the ferrule connection end face due to the mold structure, and when a bundle of 12 optical fibers are lined up in each of two rows in the conventional manner to connect 24 fibers, the connection loss is increased. Additionally, this leads to an increase in variations of product quality as the number of optical fibers increases.

In particular, in the case where the number of rows in which a bundle of 12 optical fibers are lined up is one, CH1 to CH12 are lined up in one row, and the same CHs can be connected to each other even when connectors are connected by reversing one of the connectors, but in the case where the number of rows in which a bundle of 12 optical fibers are lined up is two, CH1 and CH13 are connected to each other, which results in unstable optical characteristics.

That is, when the connectors are connected having one row and the connection end faces with the same position deviation, in the X-axis direction (optical fiber arrangement direction: lateral direction) when the connectors are connected, the two ferrules to be connected deviate in the same direction, and therefore, the position deviation in the optical fiber end face may be offset. On the other hand, in the Y-axis direction (vertical direction), the positions of the two ferrules to be connected deviate in the direction away from each other, and therefore relative position deviation amount increases. Thus, the positional accuracy in the Y-axis direction comparing to the positional accuracy in the X-axis direction significantly affects the connection loss. Accordingly, when a bundle of the optical fibers are provided in each of two rows, it is necessary to ensure the connectivity of each of the upper row and the lower row having different position deviation characteristics, the offset effect obtained in the case of one row cannot be obtained, and therefore the connection loss increases.

Therefor, in the present embodiment, as illustrated in FIG. 7, the plurality of optical fiber insertion holes 103 are arranged in a straight line, so the pin mold is held by only two pin holders, whereby the pin mold for forming the optical fiber insertion holes 103 can be accurately and reliably held. As a result, the arrangement of the optical fiber insertion holes 103 and the fiber bending angle can be accurately controlled, and the ferrule 100 can be formed with high accuracy.

In the ferrule 100 of the present embodiment, the plus-side tolerance of the internal diameter of the small diameter portion 110 is preferably within not more than 5%, and more preferably not more than 3%. Additionally, the minus-side tolerance is preferably 0%. Furthermore, in the ferrule 100 of the present embodiment, the tolerance of the pitch P for the optical fiber insertion holes 103 is preferably within ±5%, and more preferably within ±3%. Additionally, in the ferrule 100 of the present embodiment, the bending angle of the optical fiber insertion hole 103 is preferably not more than 0.5°, and more preferably not more than 0.3°.

This can provide the ferrule 100 that can achieve low loss and high density even in optical fibers having a cladding diameter of 80 μm, and have connection compatibility with conventional optical connectors.

In the present invention, the optical fiber 11 corresponds to an "optical fiber", the optical fiber insertion hole 103 corresponds to an "optical fiber insertion hole", the guide pin hole 102 corresponds to a "guide pin hole", the multi-fiber optical ferrule 100 corresponds to a "multi-fiber optical ferrule", the large diameter portion 106 corresponds to a "large diameter portion", the small diameter portion 110 corresponds to a "small diameter portion", and the multi-fiber optical connector 12 corresponds to a "multi-fiber optical connector".

Although one preferred embodiment of the present invention has been described in the foregoing, the present invention is not limited thereto. It will be appreciated that other various embodiments may be conceived without departing from the purport and scope of the present invention. Furthermore, although the operations and effects achieved by the features of the present invention have been described in the present embodiment, these operations and effects are merely examples by which the present invention is in no way limited.

Reference Signs List

11 Optical fiber
12 Multi-fiber optical connector
100 Multi-fiber optical ferrule
101 Fiber tape receiving port
102 Guide pin hole
103 Optical fiber insertion hole
104 Opening
105 Support part
106 Large diameter portion
110 Small diameter portion

The invention claimed is:

1. A multi-fiber optical ferrule, comprising:

a main body made of a resin composition;

a plurality of optical fiber insertion holes which are provided in the main body and into which optical fibers are inserted; and two guide pin holes which are provided in the main body and into which guide pins are inserted; wherein the optical fiber insertion holes comprise 24 or more holes and are provided on a straight line connecting the two guide pin holes, the optical fiber insertion holes have a small diameter portion and a large diameter portion and, an internal diameter of the small diameter portion is 81 μm, and a pitch Pm of the optical fiber insertion holes at a center part is twice a pitch P of the optical fiber insertion holes other than the center part.

2. The multi-fiber optical ferrule according to claim 1, wherein the number of the optical fiber insertion holes provided is 24, and the pitch P is 125 μm.

3. The multi-fiber optical ferrule according to claim 1, wherein the number of the optical fiber insertion holes provided is 32, and the pitch P is 125 μm.

4. The multi-fiber optical ferrule according to claim 1, wherein an internal diameter of the large diameter portion is 100 μm, and a distance of the small diameter portion is 0.5 mm.

5. The multi-fiber optical ferrule according to claim 1, wherein the internal diameter of the small diameter portion has a plus-side tolerance of within 10% and a minus-side tolerance of within 5%, the pitch P for the optical fiber insertion holes has a tolerance of within ±5%, and a bending angle of the optical fiber insertion hole is not more than 0.5°.

6. The multi-fiber optical ferrule according to claim 1, wherein the main body is an integrally formed body of a resin composition containing polyphenylene sulfide.

7. The multi-fiber optical ferrule according to claim 1, wherein the main body is installed on a photoelectric conversion element provided on a board, or an optical transceiver.

8. A multi-fiber optical connector, wherein optical fibers are connected to the multi-fiber optical ferrule according to claim 1.

9. A method of manufacturing the multi-fiber optical ferrule according to claim 1, wherein the main body is formed by injecting the resin composition into a cavity formed between an upper mold and a lower mold; and a plurality of the optical fiber insertion holes is formed by a plurality of mold pins sandwiched between the upper mold and the lower mold.

* * * * *